United States Patent Office 3,108,973
Patented Oct. 29, 1963

3,108,973
MIXED CRYSTAL OF TITANIUM TRICHLORIDE, ALUMINUM CHLORIDE, AND ALKYLALUMINUM DICHLORIDE
Edwin J. Vandenberg, Wilmington, Del., assignor to Hercules Powder Company, Wilmington, Del., a corporation of Delaware
No Drawing. Filed Feb. 16, 1961, Ser. No. 89,636
2 Claims. (Cl. 252—429)

This invention relates to a mixed crystal of titanium trichloride, aluminum chloride and an alkylaluminum dichloride.

In the Belgian patents of K. Ziegler, Nos. 533,362; 534,792; and 538,888, there is described a new process of polymerizing ethylene to a high molecular weight polyethylene under relatively mild conditions of temperature and pressure by using as the catalyst for the polymerization a mixture of a compound of a metal of groups IV–B, V–B, VI–B or VIII of the periodic table, or manganese, in combination with an organometallic compound of an alkali metal, alkaline earth metal, zinc, earth metal (especially aluminum), or rare earth metal. The usual procedure for carrying out such a process is to mix the two catalyst components in a hydrocarbon solvent and then pass ethylene into the catalyst mixture at atmospheric or slightly elevated pressure and at room temperature or moderately elevated temperatures. It has been suggested that a reduction of the tetravalent titanium or other transition metal occurs on admixture with the organoaluminum compound to produce a mixture of lower valence compounds, but the mechanics of the reaction are not known. That a reaction has taken place is generally evidenced by the formation of a colored, usually brown to black, precipitate on admixture of the two reactants.

Now in accordance with this invention it has been found that certain crystalline modifications of titanium trichloride are outstanding as one of the catalyst components used in the polymerization of $\alpha$-olefins. The new crystalline composition of this invention is a mixed crystal containing titanium trichloride, from about 0.05 to about 0.9 mole of aluminum chloride per mole of titanium trichloride and from about 0.15 to about 0.5 mole of an alkylaluminum dichloride per mole of titanium trichloride. When activated with a suitable alkylaluminum compound, or mixture of alkylaluminum compounds, this new titanium trichloride-aluminum chloride-alkylaluminum dichloride mixed crystal results in greatly improved yields of stereoregular polymers from $\alpha$-olefins, and more particularly, at much higher rates of polymerization at these higher yields of said stereoregular polymers than are obtained with an uncomplexed titanium trichloride.

The composition of this invention is believed to be a mixed crystal or cocrystal, of titanium trichloride, aluminum chloride, and alkylaluminum dichloride in the cited molar ratio. That it is not a physical mixture of titanium trichloride, aluminum chloride and alkylaluminum dichloride is shown by the fact that it contains no free aluminum chloride as indicated by X-ray analysis, by the fact that the X-ray pattern differs from that of pure titanium trichloride or a physical mixture of titanium trichloride and aluminum chloride. The X-ray pattern of this catalyst is characteristic of it and at the same time is related to that of the violet modification of titanium trichloride. Another factor is that the alkyl groups cannot be removed from this mixed crystal by physical means, as for example, by washing with inert diluents, etc., demonstrating that the alkyl group is chemically combined in the mixed crystal. The alkyl analysis of the mixed crystal is a measure of the alkylaluminum dichloride content of the mixed crystal. This mixed crystal is also essentially free from any divalent titanium. Analysis of the mixed crystal will sometimes indicate small amounts of tetravalent titanium due to inadequate washing, adventitious impurities, or due to a small amount of accidental air oxidation on handling the mixed crystal which is very reactive to air oxidation.

The new composition of this invention may be prepared in a variety of ways. One such method is by the reaction of titanium tetrachloride with a molar excess of an alkylaluminum dichloride. In general, the ratio of the alkylaluminum dichloride to titanium tetrachloride will be within the range of from about 1.5:1 to about 10:1. To produce the mixed crystal of titanium trichloride, aluminum chloride, and alkylaluminum dichloride it is essential that when the two reactants are brought together, the reaction be allowed to go to completion. Thus, for example, at a molar ratio of said alkylaluminum dichloride to titanium tetrachloride of 4:1, the reaction may be essentially complete and the mixed crystal formed on aging the reaction mixture at room temperature for only about two hours. Another method of bringing the reaction to complete is by heat-treating the reaction mixture at temperatures up to about 200° C. for very short periods. The higher the temperature, the shorter time that is required.

Instead of using a pure alkylaluminum dichloride, it is also possible to produce the mixed crystal of this invention by reacting titanium tetrachloride with the mixture of alkylaluminum chlorides known as the alkylaluminum sesquihalides; that is, mixtures of alkylaluminum dichloride with dialkylaluminum monochloride. In this case the amount of the alkylaluminum sesquichloride reacted with the titanium tetrachloride will be an amount such that the molar ratio of alkylaluminum dichloride to the titanium tetrachloride will be at least about 0.5:1 to about 2:1, and the total ratio of alkyl groups to titanium will be from about 1.5:1 to about 6:1. In carrying out the reaction when the alkylaluminum sesquihalides are reacted with the titanium tetrachloride, the reaction is preferably carried out at a low temperature; that is, a temperature of from $-20°$ C. to about $+15°$ C., and the reaction mixture is then held at that temperature for a substantial length of time, generally about two hours, after which the reaction mixture is heat-treated as described above. Instead of heat-treating the whole reaction mixture, it is possible, and in many cases preferable, to separate the insoluble reaction product and resuspend it in diluent and then heat-treat the mixture.

Any alkylaluminum dichloride may be used for the reaction with titanium tetrachloride as described above as, for example, methylaluminum dichloride, ethylaluminum dichloride, isopropyl-aluminum dichloride, isobutyl-aluminum dichloride, etc., or mixtures thereof with the corresponding dialkylaluminum chlorides, which mixtures are known as the alkylaluminum sesquichlorides.

The reaction between the titanium tetrachloride and the aluminum compound is readily carried out by mixing the two compounds in any inert diluent as, for example, aliphatic hydrocarbons, such as hexane, heptane, etc., cycloaliphatic hydrocarbons, such as cyclohexane, or aromatic hydrocarbons, such as benzene, toluene, xylene, etc., halogenated aromatic hydrocarbons, such as chlorobenzenes, chloronaphthalenes, etc., or any mixture of such inert diluents. Any concentration of the two reagents may be used that is convenient provided that the ratio of the titanium tetrachloride to the aluminum compound is maintained as described above. Either reagent may be added to the other in mixing the two, but adding the alkylaluminum dichloride to the titanium tetrachloride slowly is preferred in many cases, especially to prepare the mixed crystals of higher aluminum chloride content. The reaction product is insoluble in the diluent and precipitates out as it is formed. Another method that may be used in preparing this new composition is to simply mix the two reagents; that is, without the use of a diluent. In this case the new composition will then be isolated from the reaction mixture by extraction of the mixture with an inert solvent to remove soluble components, the insoluble part being the desired mixed crystal. The reaction of the two compounds may be carried out at any temperature, which temperature will generally be determined by the solvent, if used, the activity of the reactants, etc. The reaction, prior to the aging or heat-treatment step, is conveniently carried out at a temperature of from about −50° C. to about 150° C.

After the reaction is completed; that is, after the aging period and/or the heat-treatment, the hydrocarbon-insoluble reaction product, which is the mixed crystal of titanium trichloride, aluminum chloride, and alkylaluminum dichloride, is generally separated from the reaction mixture by centrifuging, decanting the supernatant liquid, or filtration, etc., and then washed one or more times with an inert hydrocarbon solvent so as to remove substantially all of the soluble by-products that were formed in the reaction.

The new solid mixed crystals of titanium trichloride, aluminum chloride and alkylaluminum dichloride of this invention may be used in combination with one or more organometallic compounds as activators for the polymerization of α-olefins. Generally the polymerization will be carried out in an inert diluent either as a batch or continuous operation. Suitable diluents are such as those listed above for carrying out the reaction in producing the new mixed crystals of this invention. The selection of temperature and pressure used for the polymerization process will obviously depend upon the monomer, the activity of the catalyst system being used, the degree of polymerization desired, etc. In general, the polymerization will be carried out at any temperature within the range of from about −50° C. to about 150° C., and preferably within the range of from about −20° C. to about 100° C. In the same way, while atmospheric pressure or a pressure of only a few pounds may be used, the polymerization may be carried out over a wide range of pressures, as for example, from a partial vacuum to about 1000 lbs. and preferably from about atmospheric to about 500 lbs. pressure. Higher pressures may, of course, be used, but generally do not appreciably alter the course of the polymerization. The manner in which the two catalyst components are added to the polymerization system will depend upon the method by which the polymerization is carried out. They may be added all at once, in any order, or one or the other or both may be added in increments or continuously during the polymerization.

Any α-olefin may be polymerized with the new mixed crystal trivalent titanium catalyst component of this invention in combination with an alkylaluminum compound. Thus, any compound having the general formula $CH_2=CHR$ where R is hydrogen, alkyl, cycloalkyl, aryl, or aralkyl may be so polymerized or any mixture of these monomers may be copolymerized. Exemplary of these α-olefins that may be so polymerized are ethylene, propylene, butene-1, 3-methyl 1-butene, 4-methyl 1-pentene, hexene-1, 4- and 5-methyl 1-heptenes, styrene, vinyl cyclohexane, etc.

The organometallic compound that is used in combination with the new mixed crystal of this invention, for highest rates, yields and stereoregularity, will be an alkyl aluminum compound, the specific nature of which will depend upon the monomer being polymerized. Thus, in the case of propylene and other linear 1-olefins, the best results are obtained when a dialkylaluminum chloride is used as the activator or mixtures of a dialkylaluminum chloride with small amounts of a trialkylaluminum. In the case of styrene and other α-olefins which are more readily polymerized by means of an acid catalyst, which type of polymerization is desirably avoided in the production of a highly stereoregular polymer, the alkylaluminum compound used as the activator is preferably a trialkylaluminum. The alkylaluminum compounds that are used may be any alkylaluminum compound, as for example, triethylaluminum, tripropylaluminum, triisobutylaluminum, trihexylaluminum, trioctylaluminum, tridodecylaluminum, dimethylaluminum chloride, diethylaluminum chloride, dipropylaluminum chloride, diisobutylaluminum chloride, diethylaluminum hydride, diisobutylaluminum hydride, etc., and mixtures thereof.

The following examples will illustrate the preparation of the new solid mixed crystal of titanium trichloride, aluminum chloride, and alkylaluminum dichloride in accordance with this invention and its use in the polymerization of α-olefins. The molecular weight of the polymers produced in these examples is shown by the reduced specific viscosity (RSV) given for each. By the term "reduced specific viscosity" is meant the $\eta$ sp/C. determined on a 0.1% solution of the polymer in tetrahydronaphthalene, containing 0.1 g. of the polymer per 100 ml. of solution at 135° C. unless otherwise indicated. Where the melting point of the polymer is given it is the temperature where the birefringence due to crystallinity disappears. All parts and percentages are by weight unless otherwise indicated.

EXAMPLES 1-10

In these examples the mixed crystal of titanium trichloride, aluminum chloride and alkylaluminum dichloride was prepared by mixing under nitrogen a solution of titanium tetrachloride in n-heptane with a solution of the specified aluminum compound at room temperature. The mixture was stirred and then allowed to age by standing at room temperature for the given amount of time. In Examples 9 and 10, the mixture was then heat-treated by heating for the specified length of time to a temperature of 85–90° C. in Example 9 and 50° C. in Example 10. At the end of the aging period or the heat-treatment, the reaction mixture was centrifuged, the supernatant liquid removed, and fresh n-heptane was added to bring it to the original volume. The insoluble precipitate was resuspended by agitation, and the mixture was then centrifuged, and the supernatant liquid removed. After again adding n-heptane to the original volume, the catalyst was then stored until used for the polymerization. In Table I is set forth the aluminum compound reacted with the titanium tetrachloride and the molar ratio used, the aging or heat-treatment applied to the reaction mixture along with the analysis of the final mixed crystals of titanium trichloride, aluminum chloride, and alkylaluminum dichloride. In Examples 6, 7 and 8 the ethylaluminum dichloride used contained about 10% of aluminum chloride. The total titanium was determined by adding a sample of the catalyst slurry to excess sulfuric acid, passing the solution through a Jones reductor and then titrating with sodium dichromate. The trivalent titanium content was determined by adding a sample of the catalyst slurry to excess sulfuric acid and titrating the $Ti^{+3}$ with sodium dichromate. The chloride was determined after the sample had been treated with sulfuric acid by the Volhard method. Aluminum was determined colorimetrically with 8-hydroxy quinoline after treatment of the catalyst slurry with sulfuric acid. The ethyl or methyl content was measured by the amount of the ethane or methane evolved when the sample of the catalyst slurry was treated with sulfuric acid.

In each of these examples propylene was polymerized as described below. In Examples 1 and 4, the air in a polymerization vessel was replaced with nitrogen and into it was then charged 33 parts of n-heptane and 8 parts of propylene, after which the vessel and contents were equalized at 30° C. The triethylaluminum (1 millimole) used as the activator was then introduced and the mixed crystals of titanium trichloride, aluminum chloride and ethylaluminum dichloride were added, the amount of the mixed crystal being equal to 0.25 millimole of titanium. After 4.7 hours in Example 1 and 43 hours in Example 4 at 30° C. the polymerization was stopped by the addition of 4 parts of anhydrous ethanol. Both heptane-soluble and heptane-insoluble polymers were produced. The insoluble polymer was separated by filtration, washed twice The heptane-insoluble polypropylene produced in each of these examples is a crystalline material whereas the heptane-soluble polymer is rubbery. The heptane-insoluble polypropylene produced in Example 4 had a melting point of 164° C. The amount of heptane-insoluble polymer produced and the RSV of each is shown in Table I.

Table I

| Ex. | Al Compound and aging period | Molar ratio Al:Ti | Analysis mole ratio | | | | | Al alkyl activator | Reaction | | Heptane-insoluble polymer | |
|---|---|---|---|---|---|---|---|---|---|---|---|---|
| | | | Total Ti | Ti$^{+3}$ | Al | Cl | Alkyl | | Time, hrs. | Temp., °C. | Percent | RSV |
| 1 | Al ($C_2H_5$) $Cl_2$ (aged 2 hours) | 4:1 | | | | | | Al ($C_2H_5$)$_3$ | 4.7 | 30 | 55.5 | 10.3 |
| 2 | do | 4:1 | 1.00 | 0.97 | 0.80 | 4.91 | 0.30 | Al ($C_2H_5$)$_2$Cl | 5.5 | 51 | 91 | 13.8 |
| 3 | Al ($C_2H_5$) $Cl_2$ (aged 21 days) | 4:1 | 1.00 | 0.94 | 0.95 | 5.42 | 0.40 | Al ($C_2H_5$)$_2$Cl | 6 | 50 | 91 | 12.5 |
| 4 | Al ($C_2H_5$) $Cl_2$ (aged 26 days) | 4:1 | | | | | | Al ($C_2H_5$)$_3$ | 43 | 30 | 80 | 15.3 |
| 5 | Al ($C_2H_5$) $Cl_2$ (aged 28 days) | 4:1 | 1.00 | 0.94 | 1.00 | 5.70 | 0.22 | AlEt$_2$Cl | 8 | 50 | 91.5 | 14.4 |
| 6 | Al ($C_2H_5$) $Cl_2$ (aged 2 hours) | 4.4:1 | 1.00 | 0.85 | 0.73 | 4.50 | 0.51 | Al ($C_2H_5$)$_2$Cl | 5.5 | 51 | 91.5 | 13.5 |
| 7 | Al ($C_2H_5$) $Cl_2$ (aged 21 days) | 4.4:1 | 1.00 | 0.91 | 0.95 | 5.07 | 0.50 | Al ($C_2H_5$)$_2$Cl | 6 | 50 | 92 | 13.2 |
| 8 | Al ($C_2H_5$) $Cl_2$ (aged 28 days) | 4.4:1 | 1.00 | 0.98 | 1.06 | 6.00 | 0.21 | AlEt$_2$Cl | 8 | 50 | 91.5 | 14.0 |
| 9 | Al ($C_2H_5$) $Cl_2$ (aged 20 hours at room temp. 2 hours at 85-90° C.). | 4:1 | 1.00 | 0.87 | 0.69 | 4.72 | 0.22 | AlEt$_2$Cl | 6 | 50 | 96 | |
| 10 | Al ($CH_3$) $Cl_2$ (aged 2 hours at room temp. 24 hours at 50° C.). | 4:1 | 1.00 | 1.00 | 0.45 | 3.30 | 0.14 | AlEt$_2$Cl | 72 | 50 | 92 | 33 | with n-heptane, twice with absolute ethanol and then was refluxed for 15 minutes with 40 parts of 40% methanolic hydrogen chloride, after which it was washed acid free with methanol and then dried for 4 hours at 80° C. in vacuo. It amounted to a conversion of 40% in Example 1 and 65% in Example 4. The heptane-soluble polymer was isolated by combining the reaction mixture filtrate and heptane washings, concentrating by distillation, and then precipitating the polymer by adding a large excess of anhydrous ethanol. The polymer so obtained was washed with ethanol and then dried for 16 hours at 80° C. in vacuo. It amounted to a conversion of 32% in Example 1 and 16% in Example 4. Thus, the yield of heptane-insoluble polymer was 55.5% in Example 1 and 80% in Example 4.

In Examples 2, 3 and 5–8 the polymerization was carried out by charging the polymerization vessel with 140 g. of n-heptane, 4 millimoles of diethylaluminum chloride, and an amount of the mixed crystals of titanium trichloride, aluminum chloride, and alkylaluminum dichloride equal to 2 millimoles of titanium. In Example 9 there was used 8 millimoles of diethylaluminum chloride and an amount of the mixed crystals equal to 4 millimoles of titanium and the same amount of heptane, and in Example 10 there was used 6 millimoles of diethylaluminum chloride and an amount of the mixed crystals equal to 0.8 millimole of titanium and 160 g. of heptane. After equalizing the vessel and contents at 50° C., propylene was passed in under a pressure of 15 p.s.i.g. for the specified reaction time. The polymerization was then stopped by adding an amount of n-butanol equal to about 4% of the total volume. An aliquot was taken for the analysis of soluble and insoluble polymer. Aqueous 4% caustic was then added to the reaction mixture, the aqueous layer was decanted, and the organic layer was water-washed and filtered. The heptane-insoluble polypropylene was then washed with heptane, steam distilled, washed with water and finally was dried in a vacuum oven.

EXAMPLES 11–14

The mixed crystal of titanium trichloride, aluminum chloride and ethylaluminum dichloride was prepared in these examples by adding a solution of titanium tetrachloride in n-heptane to a solution of ethylaluminum sesquichloride (containing 40% diethylaluminum chloride and 60% ethylaluminum dichloride) in n-heptane at −20° C. in Examples 11 and 12, and 0° C. in Examples 13 and 14. The mixture was allowed to stand at these temperatures for 3 hours in Examples 11 and 12, 18 hours in Example 13, and 2 hours in Example 14, after which they were heat-treated for 2 hours at 90° C. in Examples 11, 12 and 14 and 60° C. in Example 13. The reaction mixtures were then centrifuged, the supernatant liquid removed, and fresh n-heptane added. In Table II is set forth the molar ratio of ethylaluminum dichloride reacted with the titanium tetrachloride, and the analysis of the final mixed crystal of titanium trichloride, aluminum chloride, and ethylaluminum dichloride so prepared.

Each of these mixed crystals was then used for the polymerization of propylene as follows: A polymerization vessel freed of air and moisture was charged with n-heptane, 20 millimoles of diethylaluminum chloride per liter of reaction mixture, 0.5 millimole per liter of triethylaluminum and an amount of the mixed crystal equivalent to 10 millimoles of titanium per liter of reaction mixture. Propylene was passed into this reaction mixture at 50° C. and 15 p.s.i.g. for 5 hours. The polymer in each case was isolated by closing the propylene feed, bleeding off the excess gas, adding an amount of n-butanol equal to 4% of the total volume and after holding at the reaction temperature for 0.5 hour, adding the reaction mixture to aqueous 4% caustic, separating the organic layer and then separating the solid polymer by filtration, washing the polymer with fresh hydrocarbon diluent and finally drying it. In Table II are given the rate in grams of crystalline polymer produced per liter per hour, the % yield of crystalline polymer, the RSV of the polymer and Table II

| Example | Molar ratio $C_2H_5AlCl_2$:$TiCl_4$ | Analysis, mole ratio | | | | | Polymer | | | |
|---|---|---|---|---|---|---|---|---|---|---|
| | | Total Ti | Ti$^{+3}$ | Al | Cl | $C_2H_5$ | Rate g./l./hr. | Percent yield crystalline polymer | RSV | Torsional rigidity |
| 11 | 1.10 | 1.01 | 1.00 | 0.35 | 3.80 | 0.30 | 14 | 96 | 13.2 | 4,800 |
| 12 | 0.74 | 1.04 | 1.00 | 0.57 | 4.53 | 0.22 | 18.5 | 96 | 12.2 | 5,000 |
| 13 | 0.74 | 1.05 | 1.00 | 0.87 | 5.45 | 0.41 | 26.4 | 92 | 10.7 | 3,900 |
| 14 | 1.10 | 1.06 | 1.00 | 0.24 | 4.06 | 0.15 | 16.6 | 94 | | 5,740 | the torsional rigidity of the polymer in p.s.i. at 120° C. (ASTM D1043–51).

This application is a continuation-in-part of my co-pending application Serial No. 500,041, filed April 7, 1955, now U.S. Patent No. 3,058,963, issued Oct. 16, 1962.

What I claim and desire to protect by Letters Patent is:

1. As a new composition of matter a mixed crystal consisting of titanium trichloride, aluminum trichloride and alkylaluminum dichloride containing from about 0.05 to about 0.9 mole of aluminum chloride per mole of titanium trichloride and from about 0.15 to about 0.5 mole of alkylaluminum dichloride per mole of titanium trichloride.

2. As a new composition of matter a mixed crystal consisting of titanium trichloride, aluminum trichloride and ethylaluminum dichloride containing from about 0.05 to about 0.9 mole of aluminum chloride per mole of titanium trichloride and from about 0.15 to about 0.5 mole of ethylaluminum dichloride per mole of titanium trichloride.

References Cited in the file of this patent

UNITED STATES PATENTS 2,943,063     Eby et al. _____ June 28, 1960

FOREIGN PATENTS 843,385     Great Britain _____ Ahg. 4, 1960

UNITED STATES PATENT OFFICE
CERTIFICATE OF CORRECTION

Patent No. 3,108,973            October 29, 1963

Edwin J. Vandenberg

It is hereby certified that error appears in the above numbered patent requiring correction and that the said Letters Patent should read as corrected below.

Column 2, line 21, for "complete" read -- completion --; column 5, line 26, for "40%" read -- 10% --.

Signed and sealed this 21st day of April 1964.

(SEAL)
Attest:

ERNEST W. SWIDER

Attesting Officer

EDWARD J. BRENNER

Commissioner of Patents